(12) United States Patent
Ellison et al.

(10) Patent No.: US 10,221,503 B2
(45) Date of Patent: Mar. 5, 2019

(54) PHOTOPOLYMERIZABLE COMPOSITIONS FOR SOLVENTLESS FIBER SPINNING

(75) Inventors: Christopher Ellison, Austin, TX (US); Kadhiravan Shanmuganathan, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 578 days.

(21) Appl. No.: 14/110,276

(22) PCT Filed: Apr. 6, 2012

(86) PCT No.: PCT/US2012/032465
§ 371 (c)(1),
(2), (4) Date: Oct. 7, 2013

(87) PCT Pub. No.: WO2012/138960
PCT Pub. Date: Oct. 11, 2012

(65) Prior Publication Data
US 2014/0039150 A1    Feb. 6, 2014

Related U.S. Application Data

(60) Provisional application No. 61/472,700, filed on Apr. 7, 2011.

(51) Int. Cl.
| | |
|---|---|
| *D01F 6/84* | (2006.01) |
| *C08F 2/46* | (2006.01) |
| *D01D 5/38* | (2006.01) |
| *D01F 6/16* | (2006.01) |
| *D01F 6/36* | (2006.01) |
| *C08F 222/10* | (2006.01) |

(52) U.S. Cl.
CPC ............... *D01F 6/84* (2013.01); *C08F 2/46* (2013.01); *D01D 5/38* (2013.01); *D01F 6/16* (2013.01); *D01F 6/36* (2013.01); *C08F 2222/1053* (2013.01)

(58) Field of Classification Search
CPC ...................................................... D01F 6/84
See application file for complete search history.

(56) References Cited

U.S. PATENT DOCUMENTS

| 5,275,663 A | 1/1994 | Kim et al. |
| 5,558,937 A * | 9/1996 | Woods ............... B29C 67/0066 385/145 |

(Continued)

FOREIGN PATENT DOCUMENTS

| CN | 1847473 | 10/2006 |
| JP | 03-143912 | 6/1991 |

(Continued)

OTHER PUBLICATIONS

International Search Report for PCT Application No. PCT/US2012/032465 dated Jun. 21, 2012.

(Continued)

*Primary Examiner* — Larry W Thrower
(74) *Attorney, Agent, or Firm* — Meunier Carlin & Curfman LLC

(57) ABSTRACT

Disclosed are methods of fiber spinning and polymer fibers that utilize multifunctional thiol and enes compounds. Also, the subject matter disclosed herein relates to uses of polymer fibers and articles prepared from such fibers.

15 Claims, 5 Drawing Sheets

(56) References Cited

U.S. PATENT DOCUMENTS

| | | | |
|---|---|---|---|
| 8,066,932 B2 | 11/2011 | Xu | |
| 2006/0051040 A1* | 3/2006 | Baker | C03C 25/106 |
| | | | 385/128 |
| 2010/0279125 A1* | 11/2010 | Buyuktanir | B29C 39/20 |
| | | | 428/432 |

FOREIGN PATENT DOCUMENTS

| | | |
|---|---|---|
| JP | 2010244027 | 10/2010 |
| KR | 1020050005168 | 1/2005 |

OTHER PUBLICATIONS

Written Opinion for PCT Application No. PCT/US2012/032465 dated Jun. 21, 2012.

International Preliminary Report on Patentability for PCT Application No. PCT/US2012/032465 dated Oct. 8, 2013.

Cho et al. "Photo-curing kinetics for the UV-initiated cationic polymerization of a cycloaliphatic diepoxide system photosensitized by thioxanthone." European Polymer Journal, 41(2005), 367-374. (Abstract).

Crivello Synergistic effects in free radical/cationic photopolymerizations. Journal of Polymer Science: Part A: Polymer Chemistry, 45 (2007), 3759-3769. (Abstract).

Decker et al. "Photoinitiated polymerization of vinyl ether-based systems" Progress in Organic Coatings, 42 (2001), 253-266 (Abstract).

Decker Photoinitiated curing of multifunctional monomers. Acta Polymer, 45 (1994), 333-347. (Abstract).

Rajaraman et al. "Interaction of epoxy and vinyl ether during photoinitiated cationic polymerization." Journal of Polymer Science: part A: Polymer Chemistry, 37 (1999), 4007-401. (Abstract).

Wei et al. "Thiol-ene free-radical and vinyl ether cationic hybrid photopolymerization." Macromolecules, 40 (2007), 253-266. (Abstract).

* cited by examiner

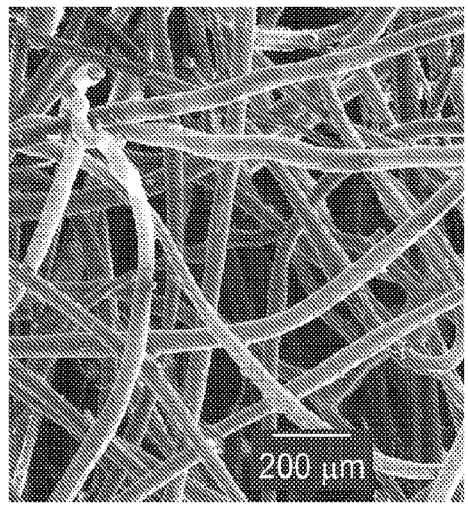 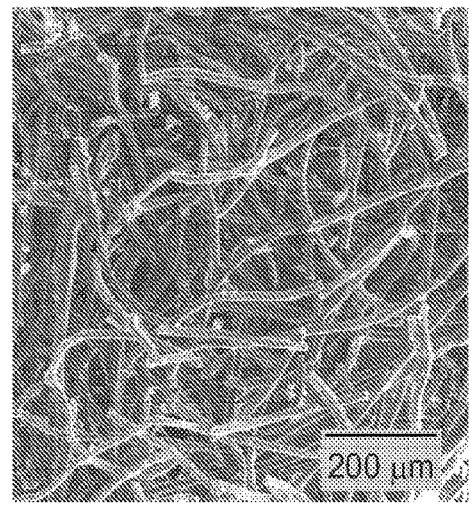
FIG.5A    FIG.5B
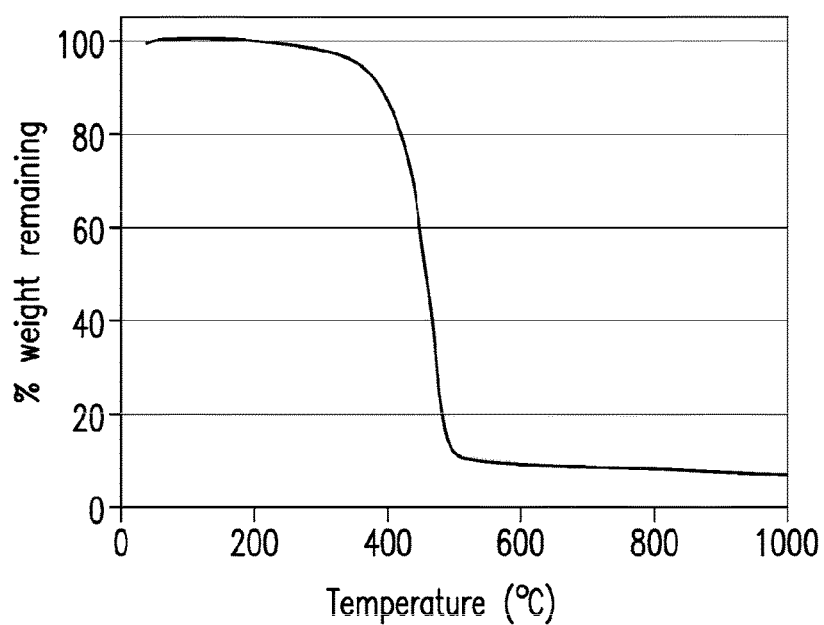
FIG.6

PHOTOPOLYMERIZABLE COMPOSITIONS FOR SOLVENTLESS FIBER SPINNING

CROSS REFERENCE TO RELATED APPLICATIONS

This application claims the benefit of priority to U.S. Provisional application 61/472,700, filed Apr. 7, 2011, which is incorporated by reference herein in its entirety.

FIELD

The subject matter disclosed herein relates to fiber spinning and polymer fibers. Also, the subject matter disclosed herein relates to uses of polymer fibers and articles prepared from such fibers.

BACKGROUND

Fibers with micrometer and nanometer scale diameters and complex architectures have been of significant interest in recent years owing to their broad scope of applications in diverse fields like regenerative medicine, optoelectronics, sensor technology, protective clothing, filtration, catalysis, etc. Among fiber spinning techniques, electrospinning, melt blowing, and rotary jet spinning are currently popular for their capabilities of producing very thin fibers ranging from tens of nanometers to a few micrometers.

Electrospinning typically involves application of a strong electric field (usually from about 10 to about 20 kV) to a polymer solution (up to 95% solvent by weight) that is ejected out of a syringe. At a critical voltage, when the electrostatic repulsive forces in the solution subdue the surface tension forces, a jet of polymer solution is driven towards a grounded collector. Rapid evaporation of solvent in the air leaves behind solid polymer fibers on the collector. As the charged jet travels towards the collector it often experiences chaotic whipping motion and, under some circumstances, various instabilities. The whipping motion is believed to amplify the stretch ratio, defined as the initial fiber diameter divided by its final diameter, resulting in fine fibers (Shin, et al., *Appl Phys Lett,* 78:1149-1151, 2011; Reneker, et al., *J Appl Phys* 87:4531-4547, 2000). Though the technique is commonly used in research laboratories, it involves use of copious amounts of solvent (e.g., 80-95 wt %) and is plagued with severe environmental and economic challenges including solvent recycling/recovery, toxicity of solvents, and a lower mass throughput due to solvent evaporation (Zhou, et al., *Polymer* 47:7497-7505, 2006). Alternatively, one can electrospin fibers from polymer melts instead of solutions. Nevertheless, processing constraints due to the high viscosity and low conductivity of polymer melts and the need for high temperature equipment capabilities affects the commercial viability.

Melt blowing involves extrusion of molten polymer through a nozzle and further stretching the continuous filaments with jets of hot air to yield very thin fibers often exceeding 1-2 μm in diameter. Under special processing conditions, it has been recently shown that fibers below 500 nm diameter could be generated from a variety of polymers using melt blowing (Ellison, et al., *Polymer* 48:3306-3316, 2007; Tan, et al., *J Non-Newton Fluid Mech* 165:892-900, 2010). Since this process does not require any solvent, it appears to be environmentally benign. However, it requires significant thermal energy both for melting the polymer and for generating hot air jets with high flow rates to entrain the molten fiber and attenuate it to finer fiber.

A spinning technique called rotary jet or force spinning has recently been developed. This technique involves spinning a polymer solution or polymer melt through a rotating nozzle and relies on centrifugal force to draw the fibers. This process is believed to have a much higher production rate of fibers as compared to that of electrospinning and doesn't require high electric field. However the process still requires the polymers to be dissolved in solvents or heated to a melt prior to fiber spinning.

What is needed are methods of making fibers that are environmentally friendly and energy efficient. Further, methods of making fibers that are nearly free of defects is also desirable. The subject matter disclosed herein addresses these and other needs.

SUMMARY

In accordance with the purposes of the disclosed materials, compounds, compositions, articles, devices, and methods, as embodied and broadly described herein, the disclosed subject matter, in one aspect, relates to fiber spinning and polymer fibers. The subject matter disclosed herein also relates to uses of polymer fibers and articles prepared from such fibers.

Additional advantages of the subject matter described herein will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects of the invention and together with the description serve to explain the principles of the invention.

FIG. 5(a) is a SEM image of thiol-ene fibers that were exposed to hot toluene at about 50° C. for 4 hours. The fibers remained intact and largely unaffected demonstrating the excellent chemical stability of thiol-ene fibers. FIG. 5(b) is a SEM image of residual thiol-ene fibers that were leftover after heating in TGA (thermogravimetric analysis) until 1000° C. These fibers were made by in-situ photopolymerization of pentaerythritol tetrakis(3-mercaptopropionate) and dipentaerythritol pentaacrylate in a 1:4.4 thiol to ene ratio along with 6 wt. % IRGACURE 2100™ as photoinitiator.

FIG. 6 is a thermogravimetric analysis plot of a thiol-ene fiber. There is no significant weight loss until up to 400° C., indicating significant thermal stability of the fibers.

DETAILED DESCRIPTION

Figure 1:
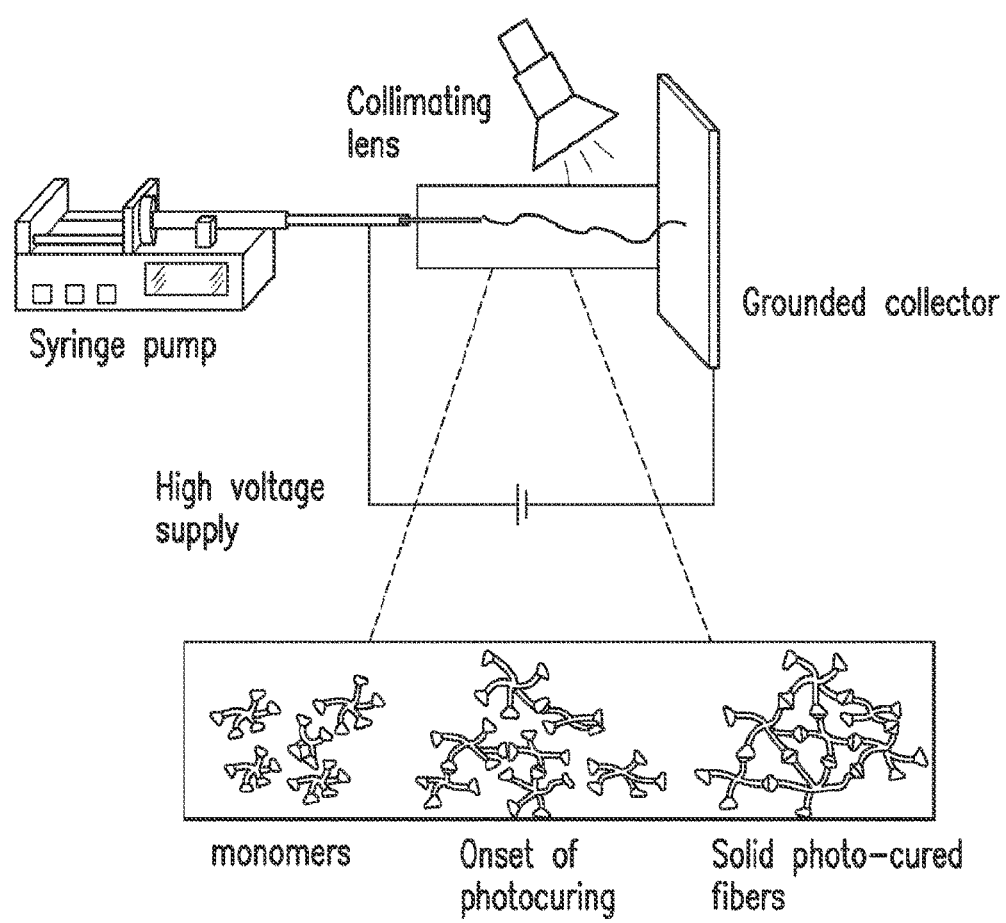
FIG. 1 is a schematic of the electrospinning set up with UV light source for in-situ photopolymerization of thiol-ene compounds during fiber spinning.

The materials, compounds, compositions, articles, devices, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a thiol" includes mixtures of two or more such thiols, reference to "an ene" includes mixtures of two or more such enes, reference to "the initiator" includes mixtures of two or more such initiators, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Reference to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

Certain materials, compounds, compositions, and components disclosed herein can be obtained commercially or readily synthesized using techniques generally known to those of skill in the art. For example, the starting materials and reagents used in preparing the disclosed materials are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of thiols A, B, and C are disclosed as well as a class of enes D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Reference will now be made in detail to specific aspects of the disclosed materials, compounds, compositions, articles, and methods, examples of which are illustrated in the accompanying Examples and Figures.

Disclosed herein are methods and compositions that involve the use of thiol-ene chemistry to make fibers, e.g., thin fibers. Specifically, disclosed herein is an in-situ photopolymerization of thiol-enes within a fiber spinning set up (e.g., electrospinning setup) as an approach for greener fiber spinning. The term thiol-ene is used herein to refer to the disclosed photopolymerizable composition, which is used in the methods disclosed herein, since these compositions comprise thiol and ene functionalized compounds. The term thiol-ene is also used herein to refer to the resulting polymer formed from polymerizing the disclosed photopolymerizable composition.

Photopolymerizable Compositions

The photopolymerizable compositions disclosed herein comprise one or more types of multifunctional ene compounds, one or more types of multifunctional thiol compounds, and one or more optional photoinitiators. In other aspects, the photopolymerizable composition comprises one or more types of multifunctional ene compounds and no or a negligible amount of thiol compounds. In still other aspect, the photopolymerizable composition can include one or more monofunctional ene compounds or one or more monofunctional thiol compounds, or mixtures thereof, alone or in combination with one or more multifunctional ene compounds, one or more multifunctional thiol compounds, or mixtures thereof.

Other optional components disclosed herein can also be included in the photopolymerizable compositions. The photopolymerizable compositions can be used neat or dissolved in a suitable solvent in the methods disclosed herein; however, it is preferred that the photopolymerization be free of solvents. Thus in a preferred aspect, the photopolymerizable compositions are substantially free of solvent. By "substantially free" is meant less than 5, 4, 3, 2, or 1 wt. % of the composition. Some suitable photopolymerizable compositions are disclosed in U.S. Pat. Nos. 7,521,015, 6,489,376, and 5,876,805, US Publication 2010/0064647, and International Publication WO95/000557, which are incorporated by reference herein for their teachings of photopolymerizable compositions.

The photopolymerizable compositions should be capable of being rapidly photopolymerized and cured. Generally, the disclosed photopolymerizable compositions can be photopolymerized by irradiating the composition with UV-light (e.g., UVA at 320 to 390 nm or UVV at 395 to 445 nm), visible light, infrared radiation, X-rays, gamma rays, microwaves, or electron beam radiation. The radiation can be monochromatic or polychromatic, coherent or incoherent, and sufficiently intense to generate substantial numbers of free radicals in the photopolymerizable compositions. Suitable sources of such radiation include the sun, tungsten lamps, halogen lamps, fluorescent lamps, lasers, xenon lamps, carbon arcs, electron accelerators, cobalt 60, and mercury vapor discharge lamps.

The amount of the mono or multifunctional ene compound and the mono or multifunctional thiol compound in the disclosed photopolymerizable composition may vary, but generally the molar amount of the ene compound is in excess of the molar amount of the thiol compound. For example, the molar ratio of multifunctional ene compound to multifunctional thiol compound can be from 10:1 to 1:1, for example, 10:1, 9:1, 8:1, 7:1, 6:1, 5:1, 4:1, 3:1, 2:1, or 1:1. It is also possible that there be no or negligible amounts or thiol compounds. Alternatively, the molar ratio of multifunctional ene compound to multifunctional thiol compound can be from 1:10 to 1:1, for example, 1:10, 1:9, 1:8, 1:7, 1:6, 1:5, 1:4, 1:3, 1:2, or 1:1. Alternatively, the weight amount of the multifunctional ene compound is in excess of the weight amount of the multifunctional thiol compound. For example, the weight ratio of multifunctional ene compound to multifunctional thiol compound can be from 10:1 to 1:10, for example, 10:1, 9:1, 8:1, 7:1, 6:1, 5:1, 4:1, 3:1, 2:1, 1:1, 1:10, 1:9, 1:8, 1:7, 1:6, 1:5, 1:4, 1:3, or 1:2. The same ratios are also contemplated when using monofunctional ene or thiol compounds.

Ene

The ene compound is a component of the photopolymerizable compositions disclosed herein. The term "ene" is used herein as shorthand notation for a mono or multifunctional ene compound. One or more different ene compounds can be used in the disclosed photopolymerizable compositions. A suitable multifunctional ene compound is any compound that has a plurality of pendant, internal, or terminally positioned unsaturated, free-radically polymerizable functional groups, i.e., "ene groups," per molecule. The multifunctional ene compound can be a di-functional ene (i.e., with two ene groups per molecule), a tri-functional ene (i.e., with three ene groups per molecule), a tetra-functional ene (i.e., with four ene groups per molecule), a penta-functional ene (i.e., with five ene groups per molecule), a hexa-functional ene (i.e., with six ene groups per molecule), or a higher functionalized ene compound (i.e., with more than six ene groups per molecule). A monofunctional ene compound has a single ene group. Compounds with multiple unsaturated carbon-carbon or carbon-heteroatom bonds can be used, e.g., alkenes, alkynes, cyclic alkene, cyclic alkynes, allyls, carbonyls, thiocarbonyls, imines, and the like. The ene compound can be cyclic, linear, or branched.

The ene groups in the disclosed multifunctional ene compounds can be separated from one another in a given molecule by an aliphatic group, aromatic group, ester, polyester, ether, or polyether groups.

Some suitable ene compounds that can be used in the methods disclosed herein can contain vinyl ether, vinyl benzene, styrene, alkylstyrene, halostyrenes, acrylates, methacrylates, acrylonitriles, vinyl chloride groups, vinyl propionate, vinyl acetate, vinyl pivalate, vinyl neononanoate; acrylamides such as N,N-dimethyl acrylamide, N,N-diethyl acrylamide, N-isopropyl acrylamide, N-octyl acrylamide, and N-t-butyl acrylamide, and (meth)acrylonitrile and the like. Other suitable ene compounds are norbornenes, vinyl esters, N-vinyl amides, allyl ethers, allyl triazines, allyl isocyanurates, unsaturated esters, N-substituted maleimides, conjugated dienes, vinyl-containing ceramic precursors and other vinyl derivatives, and '(meth)acrylated epoxidized soybean oil. Derivatives of these compounds can also be used. These compounds are all commercially available or synthesizable by methods known in the art. In one example, the ene compound is a urethane (meth)acrylate. In a preferred example, the multifunctional ene compound is dipentaerythritol pentaacrylate, as shown below.

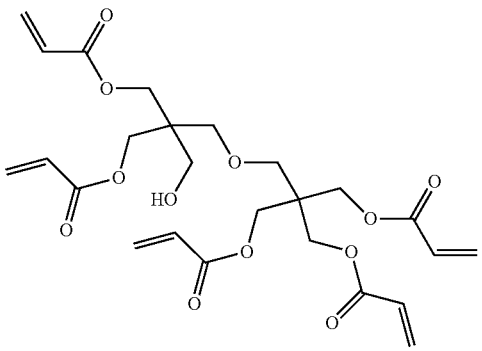 [SMILES: C=CC(=O)OCC(CO)(COCC(COC(=O)C=C)(COC(=O)C=C)COC(=O)C=C)COC(=O)C=C]

Thiol

The thiol compound is an optional component of the photopolymerizable compositions disclosed herein. The term "thiol" is used herein as shorthand notation for a monofunctional or multifunctional thiol compound. One or more different thiol compounds can be used in the disclosed photopolymerizable compositions. A suitable multifunctional thiol compound is any compound that has a plurality of pendant or terminally positioned thiol groups, i.e., SH, per molecule. The multifunctional thiol compound can be a di-functional thiol (i.e., with two thiol groups per molecule), a tri-functional thiol (i.e., with three thiol groups per molecule), a tetra-functional thiol (i.e., with four thiol groups per molecule), a penta-functional thiol (i.e., with five thiol groups per molecule), a hexa-functional thiol (i.e., with six thiol groups per molecule), or a higher functionalized thiol compound (i.e., with more than six thiol groups per molecule). A monofunctional thiol compound has a single thiol group. The thiol compound can be cyclic, linear, or branched. Preferably, the thiol compound is free of disulfide linkages.

The thiol groups in the disclosed multifunctional thiol compounds can be separated from one another in a given molecule by an aliphatic group, aromatic group, ester, polyester, ether, or polyether groups.

Some suitable thiol compounds that can be used in the methods disclosed herein are dimercaptodiethyl sulfide, 1,6-hexanedithiol, 1,8-dimercapto-3,6-dithiooctane, propane-1,2,3-trithiol, 1,2-bis[(2-mercaptoethyl)thio]-3-mercaptopropane, tetrakis(7-mercapto-2,5-dithiaheptyl)methane, trimethylolpropane tris(2-mercaptoacetate), pentaerythritol tetrakis(2-mercaptoacetate), ethylene glycol bis(3-mercaptopropionate), dipentaerythritol hexakis(3-mercaptopropionate), 1,4-butanediol bis(3 mercaptopropionate), tris[2-(3-mercaptopropionyloxy)ethyl]isocyanurate, tetraethylene glycol bis(3-mercaptopropionate), ethylene glycol bisthioglycolate, trimethylolethane trithioglycolate, 1,4-butanediol bismercaptoacetate, trithiocyanuric acid and glyceryl thioglycolate, or combinations of these materials. Further examples of suitable thiol compounds include α- or β-mercaptocarboxylic acids such as thioglycolic acid or β-mercaptopropionic acid. Still further examples of suitable thiol compounds include ethylene glycol bis(thioglycolate), pentaerythritol tetrakis(3-mercaptopropionate), ethylene glycol bis(3-mercaptopropionate), trimethylolpropane tris(thiolglycolate), trimethylolpropane tris(3-mercaptopropionate), pentaerythritol tetrakis(thioglycolate), polypropylene ether glycol bis(3-mercaptopropionate), poly-2-mercaptoacetate, and poly-3-mercaptopropionate esters (particularly, trimethylolpropane triesters or pentaerythritol tetraesters), which are all commercially available or synthesizable by methods known in the art. In one preferred example, the multifunctional thiol compound is pentaerythritol tetrakis(3-mercaptopropionate), as shown below.

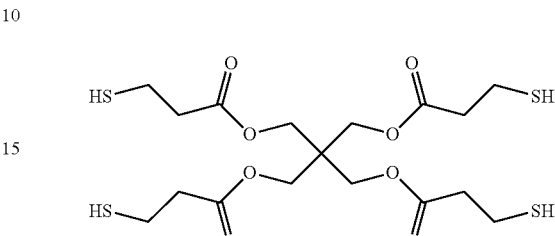

Photoinitiator

An optional component of the photopolymerizable composition is a photoinitiator. Suitable examples of photoinitiators include benzophenones, acetophenone derivatives such as α-hydroxyalkylphenylketones, benzoin ethers, acylphosphonate derivatives, benzoin alkyl ethers and benzyl ketals, monoacylphosphine oxides, and bisacylphosphine oxides. Other examples of photoinitiators that can be used are ethyl 2,4,6-trimethylbenzoylphenyl phosphinate, 2 hydroxy-2-methyl-1-phenyl-propan-1-one, 2,2-dimethoxy-2-phenylacetophenone, hydroxycyclohexylphenylketone, dimethoxylphenylacetophenone, mercaptobenzothiazoles, mercaptobenzooxazoles, hydroxy ketones, phenylglyoxylates, aminoketones, metallocenes, iodonium salts and hexaryl bisimidazole, which are all commercially available or synthesizable by methods known in the art. Additional photoinitiators are disclosed in U.S. Pat. Nos. 5,472,992 and 5,218,009, which are incorporated by reference herein for their teachings of photoinitiators. In a preferred embodiment, the photoinitiator is IRGACURE 1700™, DAROCUR 4265™, IRGACURE 819™, IRGACURE 819DW™, IRGACURE 2022™ or IRGACURE 2100™ or 2,2-dimethoxy-2-phenylacetophenone, which is commercially available from Ciba Additives. The photoinitiator can usually be used in an amount of less than about 10, 9, 8, 7, 6, 5, 4, 3, 2, or 1 wt. % of the photopolymerizable composition. However, higher amounts, such as greater than about 10 wt. % of photoinitiator can be used.

The photoinitiator can also be part of either the ene or thiol compound. That is, the photoinitator can be a functional group on, and thus covalently bonded to, the ene or thiol compound.

Additional Components

The photopolymerizable compositions can comprise additional components such as viscosity modifiers, surfactants, stabilizers, pigments, dyes, plasticizers, fillers, thermally stable inorganic materials, crosslinking agents, and the like. Suitable crosslinking agents can be found in U.S. Pat. No. 7,767,728, which is incorporated by reference herein for its teachings of crosslinking agents.

In one example, a reactive diluent can be present in the photopolymerizable compositions. A reactive diluent can be used to adjust the viscosity of the photopolymerizable composition and can be a low viscosity monomer capable of photopolymerization. Reactive diluents have a molecular weight of less than about 550 g/mol and can be used in the photopolymerizable composition in an amount of less than about 30, 25, 20, 15, 10, 5, or 1 wt. % of the photopolymerizable composition. Suitable reactive diluents can be found in U.S. Pat. Nos. 7,521,015 and 6,489,376, which are incorporated by reference herein for their teachings of reactive diluents.

Stabilizers can also be used. Examples of suitable stabilizers are non-acidic nitroso compounds, particularly N-nitrosohydroxylarylamines and derivatives thereof. Alternatively, the stabilizer can be an alkenyl substituted phenolic compound and one or more compounds selected from the consisting of a free radical scavenger, a hindered phenolic antioxidant and a hydroxylamine derivative. Examples of suitable alkenyl substituted phenolic compounds include 2-propenylphenol, 4-acetoxy styrene, 2 allylphenol, isoeugenol, 2-ethoxy-5-propenylphenol, 2-allyl-4-methyl-6-t-butylphenol, 2-propenyl-4-methyl-6-t-butylphenol, 2-allyl-4,6-di-t-butylphenol, 2-propenyl-4,6-di-t-butylphenol and 2,2'-diallyl-bisphenol A. A radical scavenger such as p-methoxy phenol (MEHQ) and a hindered phenolic antioxidant such as butylated hydroxy toluene (BHT) can be used as well.

Inorganic compounds, sol-gel precursors and ceramic precursor monomers could also be blended with the photopolymerizable compositions to yield thermally stable and highly porous ceramic micro and nanofibers with other post-treatments like calcination. Examples of inorganic compounds include but not limited to tetraethylorthosilicates and oxides like $Al_2O_3$, $TiO_2$, $SiO_2$, $PbZr_3Ti_{1-x}O_3$, CuO, NiO, $V_2O_5$, ZnO, $Co_3O_4$, $Nb_2O_5$, $MoO_3$, $MgTiO_3$, $SnO_2$, $BaTiO_3$, ITO, $GeO_2$, $NiFe_2O_4$, and $LiCoO_2$ (Li, et al., Advanced Materials, 16: 1151-1170, 2004).

Organic and inorganic micro or nanofibers, nanotubes, nanowhiskers, nanoparticles and platelets could also be added as re-inforcing agents in the photopolymerizable composition Fiber Spinning Methods There have been a few attempts of photocuring electrospun fibers, but they involved post-curing of spun fibers (Tan, et al., J Biomed Mater Res Part A, 87A:1034-1043, 2008) and employ solvents to dissolve the photocurable polymer for processing (Gupta, et al., Macromolecules, 37:9211-9218, 2004; Theron, et al., Acta Biomater 6:2434-2447, 2010). One report involves pre-heating small molecule monomers to thermally induce oligomer formation and later spinning fibers from this mixture (monomer acting as solvent plus oligomers) by in-situ photopolymerization (Kim, et al., Macromolecules 38:3719-3723, 2005). The main objective in these investigations was to impart chemical stability to the final fibers by photocrosslinking.

The methods disclosed herein do not require solvents or applied heat energy during fiber formation. Thus, pre-heating the monomers before polymerization, heating the fibers after polymerization, and/or heating the fibers before, during, or after spinning is not needed. Consequently, in certain aspects, the disclosed methods do not involve the active application of heat energy. The disclosed methods can also be broadly adapted to many fiber spinning techniques and used as an energy efficient and environmental friendly process to make fibrous scaffolds for tissue engineering and drug delivery, non-woven mats for filtration masks, surgical accessories and fibers for reinforced composites, among other applications.

In the disclosed methods the photopolymerizable compositions disclosed herein, which comprise one or more types of multifunctional ene compounds, one or more types of multifunctional thiol compounds, and one or more optional photoinitiators or additional components, is photopolymerized while being spun into a fiber or fibers, i.e., in-situ photopolymerization. The fiber can be spun by use of an electrospinning set up, or other fiber spinning technique discussed herein or known in the art. The photopolymerization is initiated by irradiating the photopolymerizable composition before, during, and/or after fiber spinning Types and sources of suitable irradiation are disclosed elsewhere herein.

Thiol-ene photopolymerizations typically follow a step-growth radical polymerization mechanism involving a multifunctional thiol and a wide variety of enes. However in cases where the ene monomer readily homopolymerizes (e.g., acrylates, methacrylates, or vinyl benzenes) there is a competition between step growth and chain growth polymerizations. In such cases, vinyl groups will be consumed by both homopolymerization and propogation/chain transfer with thiols, and using a 1:1 stoichiometric mixture of thiol to ene results in less conversion of thiol compared to ene. To achieve roughly equivalent conversion of functional groups, the stoichiometry should be appropriately adjusted. The chemistry and kinetics of thiol-ene polymerizations has been studied extensively by Hoyle (Hoyle, et al., J Polym Sci Pol Chem 42:5301-5338, 2004) and Bowman (Hoyle, et al., Angew Chem-Int Edit 49:1540-1573, 2010; Cramer, et al., J Polym Sci Pol Chem 42:5817-5826, 2004), which references are incorporated by reference herein in their entireties for their teachings of thiol-ene polymerizations. The photoinitiator, upon activation by light, abstracts a hydrogen atom from a thiol forming a thiyl radical. The thiyl radical propagates by attacking the ene group. This is followed by a chain transfer of the carbon-centered radical to another thiol functional group, forming a thioether linkage and regeneration of a thiyl radical. The successive propagation/chain transfer mechanism forms the basis for the step growth polymerization. Termination occurs by the coupling of any two radical species (Morgan, J Polym Sci Pol Chem 15:627-645, 1977, which is incorporated by reference herein in its entirety for its teachings of thiol-ene polymerizations).

Thiol-ene photopolymerizations have a distinct advantage over traditional acrylic photopolymerizations in that they are not significantly inhibited by oxygen and are generally polymerizable without additional photoinitiator molecules (Cramer, et al., Macromolecules 35:5361-5365, 2002, which is incorporated by reference herein in its entirety for its teachings of thiol-ene polymerizations). Adding a photoinitiator can still help to enhance the rate of polymerization.

FIG. 1 is a schematic of a setup that can be used to photopolymerize thiol-enes while electrospinning. Other fiber spinning set ups such as melt blowing and rotary jet or force spinning can be used in the disclosed methods. The apparatus for these various fiber forming techniques are known and often commercially available. These set ups can be used with the disclosed photopolymerizable compositions in a manner consistent with the disclosed methods. Moreover, the disclosed methods can be performed in batches or continuously.

In certain aspects, the disclosed methods can be used with an electrospinning set up. Both thiol-ene photopolymerizations and electrospinning are highly capable technologies, but integrating them together has various challenges. One difficulty is matching the curing kinetics with the very high velocity of the fluid jet moving towards collector. Reneker et al. reported the measured jet velocity during fiber spinning to be about 0.5 m/s. A rough estimate of the average jet velocity at the collector based on feed rates from the disclosed processes and other parameters results in about 1 m/s, which is very close to reported values. Combining this with the distance to the collector, the available time for photopolymerizing the disclosed thiol-enes in-situ is on the order of 1/10th of a second. Hence, a very high speed curing thiol-ene system is required in the disclosed methods.

A relevant parameter defining suitable speeds involves the gel point ($\alpha$) for forming a cross-linked network of thiol-enes by light. The gel point depends on the functionality of the thiols and -enes and can be obtained as follows (Hoyle, 2004), $$\alpha = \frac{1}{[r(f_{thiol} - 1)(f_{ene} - 1)]^{1/2}} \quad \text{(Equation 1)}$$

where r is the thiol to ene molar ratio, $\eta_{thiol}$ is the functionality of the thiol, and $\eta_{ene}$ is the functionality of ene. For instance, when trifunctional thiols and -ene monomers are used gelation takes place at 50% conversion of thiol and ene groups and for tetrafunctional monomers, gelation is at 33% conversion of functional groups. In order to ensure in-situ photopolymerization of thiol and enes within the fraction of a second that is available in the electrospinning process, a penta- or higher functional ene and a tetra- or higher functional thiol can be used.

In methods where the velocity of the stream is decreased, the distance to the collector is increased, or other parameters are adjusted to permit slower conversion times, di-, tri-, and tetra-functional enes can be used with di- and tri-functional thiols.

Figure 2A:
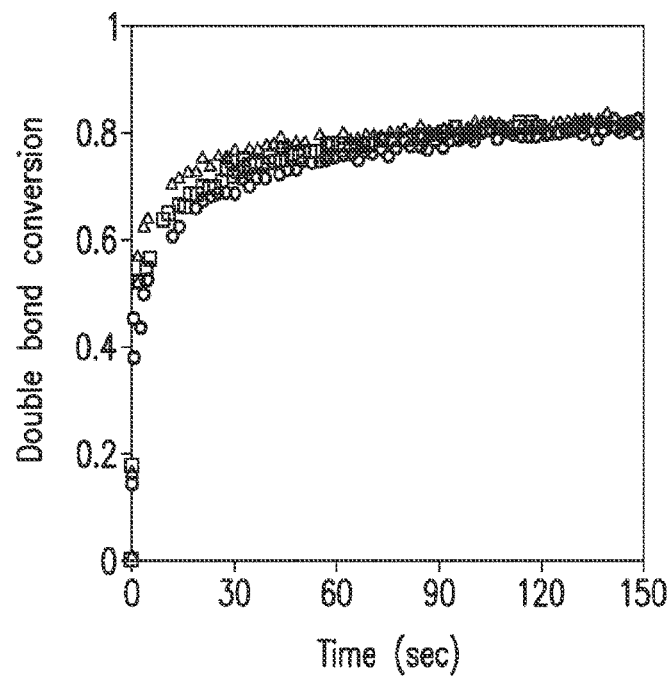
FIG. 2(a) shows double bond conversion by real time FTIR spectroscopy measurements taken in air for the photopolymerization of PETT (pentaerythritol tetrakis(3-mercaptopropionate)) and DPPA (dipentaerythritol pentaacrylate) of different thiol:ene ratios based on: thiol:ene=1:5.6 (open circles), thiol:ene=1:4.4 (open squares), thiol:ene=1:3.4 (open triangles).
Figure 2B:
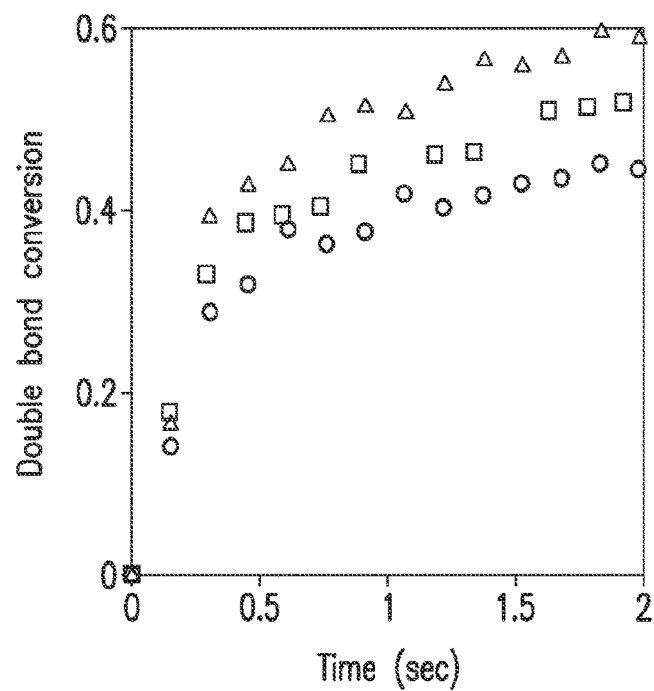
FIG. 2(b) contains data from FIG. 2a re-plotted to show the kinetics of curing in the first few seconds of light exposure. Curing speed increases with increase in thiol content to 40-50% double bond conversion in less than a second. Samples irradiated at about 200 mW/cm$^2$ using 6 wt. % IRGACURE 2100™ as photoinitiator. (Data collected approximately every 0.15 sec. For clarity every 10$^{th}$ data point has been plotted in FIG. 2a). These plots are based on infrared spectroscopy analysis (Shanmuganathan et al. *Chemistry of Materials,* 23: 4726-4732, 2011).

Another factor in photocuring is selection of the photoinitiator. The photoinitiator should be miscible with the thiol-ene system and facilitate efficient high speed curing. A suitable photoinitiator is IRGACURE 2100™, a phosphine oxide based initiator whose absorption band is strong throughout the UV and extends slightly into the visible wavelengths. Moreover, it is a liquid initiator and mixes quickly with other thiol-ene components making the preparation time shorter. Using these components, suitably rapid curing kinetics were achieved for fiber spinning as shown in the infrared spectroscopy data in FIG. 2. Other suitable photoinitiators are disclosed herein. As such, with the use of certain photoinitiators, low functionalized enes and thiols can be utilized.

Another factor is that the spinning fluid should have desired viscoelasticity to balance surface tension forces. While lower viscosity often leads to droplets formed by surface tension driven jet breakup (electrospraying), higher viscosity can promote thicker fibers. The viscosity range of polymer melts used in electrospinning and melt blowing are typically from about 1 to about 100 Pa-s (Tan, et al., *J Non-Newton Fluid Mech* 165:892-900, 2010; Dalton, et al., *Polymer* 48:6823-6833, 2007). Viscosity can be measured with rheometers using dynamic oscillatory sweeps or steady shear flow. Typically, the thiolene mixture is placed in a cone-plate or parallel plate geometry and viscosity measurements are made by a frequency sweep (0.01-100 Hz) in the linear viscoelastic regime, which can be determined by dynamic strain sweep experiments. The viscosity of the spinning mixture here depends on the viscosity of multi-functional thiol and ene compounds and the ratio of these components in the photopolymerizable composition. Since the thiol to ene group ratio in the photopolymerizable composition has an effect on curing kinetics and physical properties, a composition that has high curing speed and desired viscosity should be used. In a thiol-acrylate system, acrylates tend to homopolymerize faster. Hence, having a 1:1 ratio of thiol to ene groups can result in incomplete conversion of thiol functional groups. Previous studies have shown that a 1:4 ratio of thiol to ene groups leads to roughly equivalent conversion of both functional groups (Cramer, et al., *Macromolecules*, 35:5361-5365, 2002).

Generally, the viscosity of the photopolymerizable composition can be from about 1 to about 100 Pa-s, which can be measured as explained above. For example, the viscosity can be from about 1 to about 90, from about 10 to about 80, from about 20 to about 70, from about 30 to about 60, from about 40 to about 50, from about 1 to about 70, from about 1 to about 50, from about 1 to about 30, from about 20 to about 100, from about 40 to about 100, from about 60 to about 100, or from about 80 to about 100 Pa-s. A reactive diluent as disclosed herein can be used to adjust the viscosity of the photopolymerizable compositions.

Techniques for electrospinning fibers are described in a number of patents and the general literature. Use of commercially available electrospinning devices, such as those available from NanoStatics™, LLC, Circleville, Ohio, USA; and Elmarco s.r.o., Liberec, Czech Republic (e.g., using Nanospider™ technology), are preferred. A typical electrospinning apparatus for use in the disclosed methods includes three primary components: a high voltage power supply, a spinneret, and a collector (effectively a grounded conductor). The spinneret is a spin electrode that allows for extracting fibers by way of an electric field. It can be a syringe, a cylinder rotating in a melt, a capillary device or a conductive surface, that is connected to a feeding system for introducing the fiber-forming self-assembling material useful in the present invention. A preferred system uses a pump to control the flow of the material out of, for example, a syringe nozzle allowing the material to form a Taylor cone.

The disclosed photopolymerizable composition in liquid form is fed into or onto the spinneret from, for example, the syringe at a constant and controlled rate using a metering pump. A high voltage (e.g., 1 to 50 kV) is applied and the drop of material at the nozzle of the syringe becomes highly electrified. At a characteristic voltage the droplet forms a Taylor cone, and a fine jet of material develops. The fine jet is drawn to the grounded collector which is placed opposing the spinneret. While being drawn to the collector, the jet cools and hardens into fibers. In a preferred method disclosed herein, the jet is irradiated with light in route to the collector to in-situ photopolymerize the polymer. The fibers are deposited on the collector as a randomly oriented, non-woven mat or individually captured and wound-up on a roll. The fibers are subsequently stripped from the collector.

The parameters for operating the electrospinning apparatus for effective spinning of the disclosed photopolymerizable compositions can be readily determined by a person of ordinary skill in the art without undue experimentation. By way of example, the spin electrode temperature is maintained at about 10° C. above the melting point or temperature at which the photopolymerizable composition has sufficiently low viscosity to allow thin fiber formation, and the surrounding environmental temperature maintained at about similar temperatures. In a preferred example, the apparatus and surrounding environment is kept at ambient temperature and no external heat is applied to the photopolymerizable composition or apparatus. The applied voltage is generally about 1 to about 120 kV, for example, from about 1 to about 50 kV. For example, the applied electric field can be from about 10 to about 20 kV, for example, the electric field can be about 10, 11, 12, 13, 14, 15, 16, 17, 18, 19, or 20 kV, where any of the stated values can form an upper or lower endpoint of a range.

The electrode gap (the gap between spin electrode and collector) is generally between about 3 cm and about 50 cm, preferably about 3 and about 19 cm. Preferably, the fibers can be fabricated at about ambient pressure (e.g., 1.0 atmosphere) although the pressure can be higher or lower.

The fibers prepared by the methods disclosed herein can have an average diameter of about 1000 nm or less, more preferably about 800 nm or less, and more preferably about 600 nm or less. For example, the fiber can have an average diameter of from about 10 µm to about 1 mm. For example, the disclosed methods can be used to make fibers from about 10 µm to about 1 µm, from about 50 µm to about 500 µm, from about 100 µm to about 300 µm, from about 500 µm to about 1 mm, from about 10 µm to about 300 µm, from about 10 µm to about 100 µm, from about 300 µm to about 800 µm, or from about 500 µm to about 1 mm in average diameter. Alternatively, the polymer fiber can have an average diameter of from about 10 nm to about 10 µm. For example, the disclosed methods can be used to make fibers from about 10 nm to about 1 µm, from about 50 nm to about 500 nm, from about 100 nm to about 300 nm, from about 500 nm to about 10 µm, from about 10 nm to about 300 nm, from about 10 nm to about 100 nm, from about 300 nm to about 800 nm, or from about 500 nm to about 1 µm in diameter. In other examples, the fibers can be less than about 10 µm, 1 µm, 800 nm, 500 nm, or 100 nm in average diameter. In still other examples, the disclosed methods can be used to prepare fibers with an average diameter of greater than about 10 µm, 100 µm, 500 µm, 800 µm, or 1 mm. Average fiber diameter for a plurality of fibers can be determined by processing a scanning electron microscopy image thereof with, for example, a QWin image analysis system (Leica Microsystems GmbH, 35578 Wezlar, Germany).

The electrospinning techniques used herein can provide fibers with a variety of diameters and lengths. These fibers can have multiple uses and applications, such as filtration, cleaning, acoustical, medical, and energy conservation applications, and can be used, for instance, for manufacturing medical gowns, cosmetics, sound insulation, medical scaffolds, apparel, and barrier materials. The fibers can also be suitable for use in short-life and long-life applications such as those defined by INDA end-use classification (Association of Non-woven Fabrics Industry, Cary, N.C.) including, but not limited to, hygiene (diaper coverstock, adult incontinence, training pants, underpads, feminine hygiene), wiping cloths, medical/surgical, filtration (air, gasses, liquids), durable paper, industrial garments, fabric softeners, home furnishings, geotextiles, building and construction, floor covering backings, automotive fabrics, coatings and laminating substrates, agricultural fabrics, apparel interfacings and linings, shoes and leather, and electronic components.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Various mixtures were prepared to illustrate compositions having suitable viscosity and curing speed. Table 1 shows the complex viscosity of certain thiol-ene mixtures.

TABLE 1

Complex viscosity of various mixtures of pentaerythritol tetrakis (3-mercaptopropionate) (thiol) and dipentaerythritol pentaacrylate (ene).

| Sample | Ratio of thiol:ene groups | Complex Viscosity* (Pa · s) |
| --- | --- | --- |
| TA mixture 1 | 1:3.4 | 1.2 |
| TA mixture 2 | 1:4.4 | 1.7 |
| TA mixture 3 | 1:5.6 | 2.1 |

*Complex viscosity at 1 Hz and 50% strain

Example 2

Figure 3:
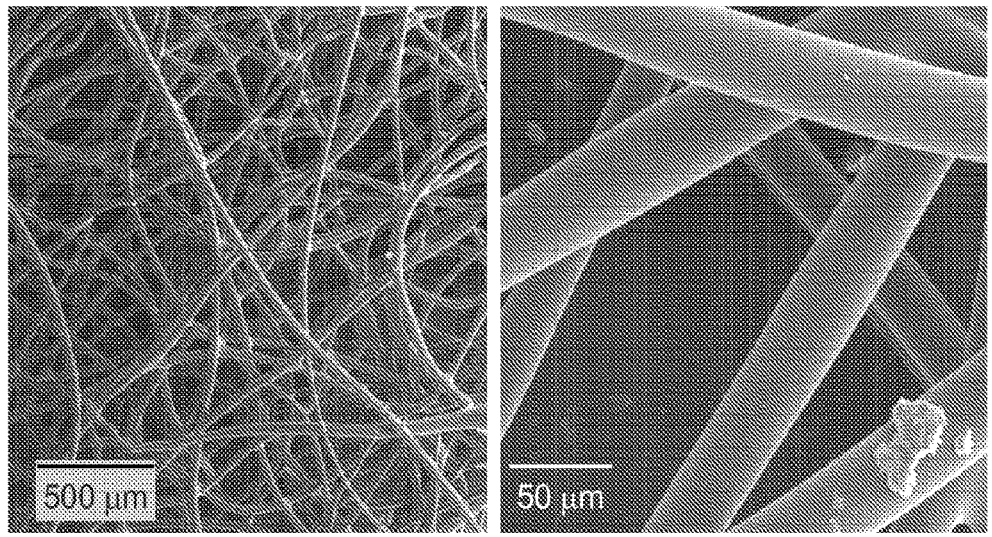
FIG. 3 is a pair of low and high magnification SEM images of thiol-ene fibers made by in-situ photopolymerization of pentaerythritol tetrakis(3-mercaptopropionate) and dipentaerythritol pentaacrylate in a 1:4.4 thiol to ene ratio along with 6 wt. % IRGACURE 2100™ as photoinitiator.

The different thiol-ene mixtures shown in Table 1 along with IRGACURE 2100™ (6% w/w on the total weight of thiol-ene mixture) as photoinitiator were electrospun using a syringe needle (0.8 mm diameter) with an applied DC voltage of 18 kV, a solution feed rate of 10 mL/hr and a distance of 14 cm between the needle tip and grounded collector. As the thiol-ene mixture emanating from the needle was approaching the grounded collector, it was photopolymerized with a UV-visible light source (350-700 nm) at an intensity of about 200 mW/cm$^2$ positioned closer to the collector such that the light falls both on the jet near the collector and on the collector as well. This positioning yielded solid well cured fibers through efficient and timely curing of the thiol-enes. Curing the thiol-enes at a slightly earlier position before the collector can limit the stretching of the polymer resulting in thicker fibers, while a delayed curing can result in significant deformation and fusion of fibers depositing on the collector. FIG. 3 shows the electron microscopic images of fibers spun with a 1:4.4 ratio of thiol to ene groups (TA mixture 2). This mixture had the appropriate viscosity and curing speed to yield good solid fibers on the collector that were almost free of bead defects. The fiber diameter varied between 15-35 µm. The fluid jet emanating from the needle was stable until it hit the collector. In typical solution electrospinning, polymer fluid ejecting out of the needle is subjected to bending instabilities leading to a whipping motion of the jet (Shin et al.; Reneker et al.). This is believed to impart significant stretch on the polymer jet leading to ultrathin fibers. In spinning of high viscosity polymer melts (about 5 to about 100 Pa.s) by electrospinning, the bending instability is significantly suppressed and hence relatively thicker fibers are obtained. The viscosities of the thiolene mixtures (Table 1) are in the range of melt viscosity of polymers and hence the bending instabilities are suppressed here as well.

Figure 4:
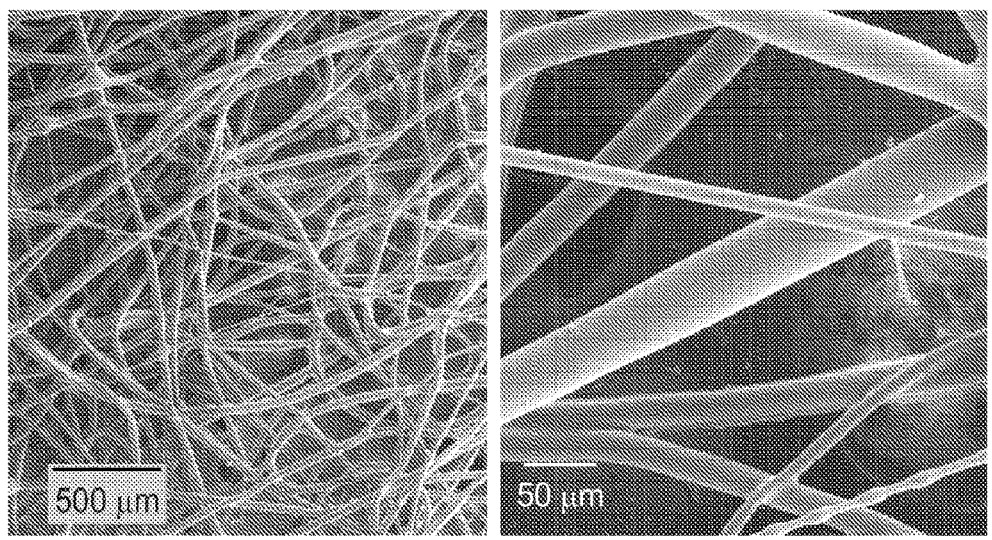
FIG. 4 is a pair of low and high magnification SEM images of thiol-ene fibers made by in-situ photopolymerization of pentaerythritol tetrakis(3-mercaptopropionate) and dipentaerythritol pentaacrylate in a 1:4.4 thiol to ene ratio along with 6 wt. % IRGACURE 2100™ as photoinitiator. Air was blown near the collector to introduce some instability in the jet, which led to some thin fibers of less than about 10 μm.
Figure 7:
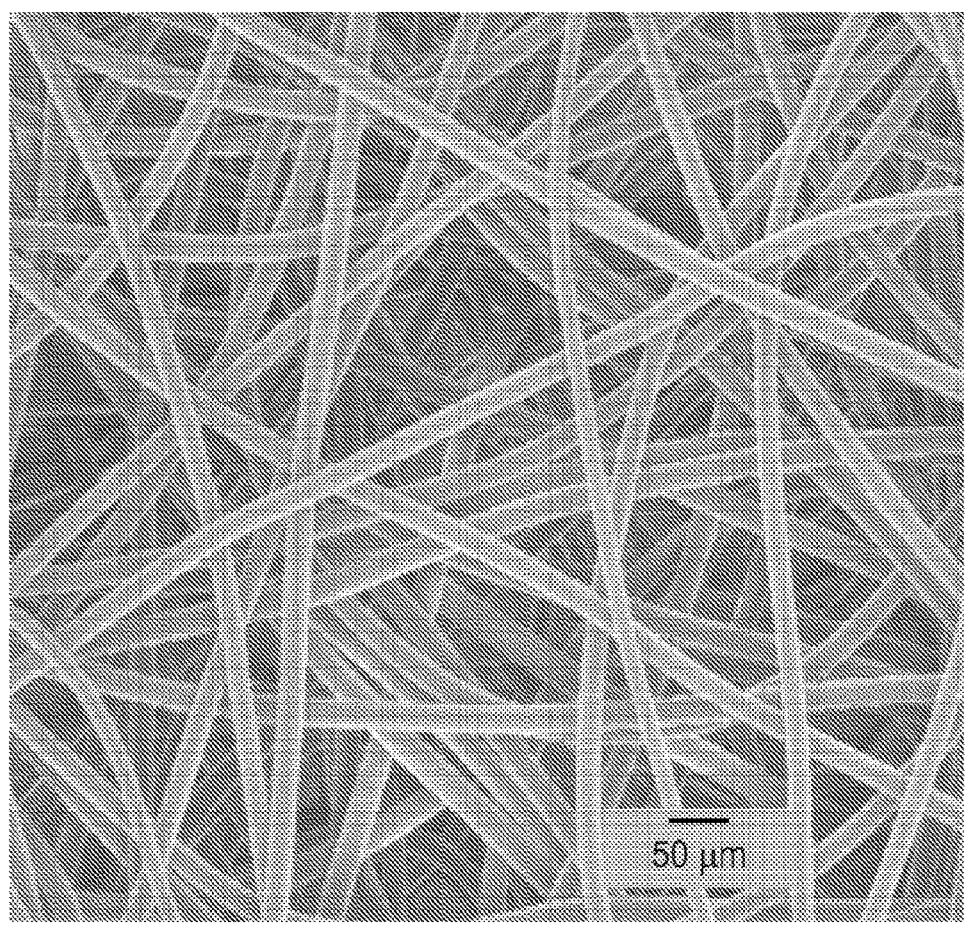
FIG. 7 is a SEM image of thiol-ene fibers made by photopolymerization of tris[4-(vinyloxy)buytl]mellitate and pentaerythritol tetrakis(3-mercaptopropionate).

Some bending instability of the jet was created by blowing air near the collector. This created a wavy motion of fluid jet before it hit the collector and led to some thinner fibers (less than about 10 μm). FIG. 4 shows a distribution of thin and thick fibers obtained by spinning a 1:4.4 mixture of thiol:ene under similar electrospinning conditions as mentioned above but with air blowing near the collector.

Example 3

The thiol-ene fibers that were obtained by in-situ photopolymerization had good resistance to chemical solvents when fully cured. This was confirmed by immersing the fibers in hot toluene at 50° C. for 4 hours. The fibers showed very good chemical resistance and their morphology was unaffected (FIG. 5a). The fibers also had excellent thermal stability showing negligible decomposition up to 400° C. (FIG. 6).

The fibers when heated to 1000° C. in a thermogravimetric analyzer retained their morphology indicating their superior thermal stability (FIG. 5b). These fibers were brittle. They can be made strong useful ceramic fibers by adding some other thermally stable inorganic materials.

Thus it has been demonstrated herein a greener fiber spinning route using thiol-ene photopolymerizations. Apart from being a solventless energy efficient process, the use of thiol-ene chemistry presents many advantages. The fibers can be spun in ambient atmosphere. The chemistry is versatile and tunable to particular applications. Though electrospinning is illustrated in the Examples, this chemistry can be broadly adapted in other continuous or batch spinning methods to create ultrathin fibers. By modifying the chemistry and/or engineering of the fiber spinning process, fibers in the nanometer range can be obtained. Nanofibers are of significant interest in biological applications like scaffolds, tissue engineering etc and in other areas including but not limited to filtration, gas transport and protective clothing. By blowing air in the fiber collection zone, stretching of the fiber is enhanced resulting in reduction in fiber diameter.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible aspects may be made of the invention without departing from the scope thereof, it is to be understood that all matter herein set forth is to be interpreted as illustrative and not in a limiting sense.

What is claimed is:

1. A method for forming a polymer fiber, comprising:
   (a) providing a photopolymerizable composition that is substantially free of solvent and that consists essentially of one or more ene compounds, one or more thiol compounds, and a photoinitiator;
   (b) spinning the photopolymerizable composition into a fiber; and
   (c) irradiating the photopolymerizable composition with radiation during or after fiber spinning to polymerize the photopolymerizable composition into a polymer, wherein the fiber consists essentially of the polymer.

2. The method of claim 1, wherein the ratio of the one or more thiol compounds to the one or more ene compounds is from 1:10 to 10:1.

3. The method of claim 1, wherein the thiol compound is a tetra-, penta-, hexa-, or higher functionalized thiol compound.

4. The method of claim 1, wherein the ene compounds is a penta-, hexa-, or higher functionalized ene compound.

5. The method of claim 1, wherein at least one thiol compound is a tetra-functionalized thiol compound and at least one ene compound is a penta-functionalized ene compound.

6. The method of claim 1, wherein the photoinitiator is bonded to one or more of the ene compounds or one or more of the thiol compounds.

7. The method of claim 1, wherein the radiation is UV-light, visible light, infrared radiation, X-rays, gamma rays, microwaves, or electron beam radiation.

8. The method of claim 1, wherein spinning the photopolymerizable composition is by electrospinning.

9. The method of claim 1, wherein spinning the photopolymerizable composition is by rotary jet spinning or by melt blowing.

10. The method of claim 1, wherein at least one ene compound is dipentaerythritol pentaacrylate.

11. The method of claim 1, wherein at least one thiol compound is pentaerythritol tetrakis(3-mercaptopropionate).

12. The method of claim 1, wherein at least one ene compound is dipentaerythritol pentaacrylate and at least one thiol compound is pentaerythritol tetrakis(3-mercaptopropionate).

13. The method of claim 1, wherein the fiber has a diameter of about 1000 nm or less.

14. The method of claim 1, wherein the fiber has a diameter of from 15 to 35 μm.

15. The method of claim 1, wherein the photopolymerizable composition is irradiated during fiber spinning.

* * * * *